(12) United States Patent
Hehmeyer

(10) Patent No.: US 8,457,897 B2
(45) Date of Patent: Jun. 4, 2013

(54) METHODS AND SYSTEMS TO ESTIMATE WELLBORE EVENTS

(75) Inventor: Owen J Hehmeyer, Houston, TX (US)

(73) Assignee: ExxonMobil Upstream Research Company, Houston, TX (US)

(*) Notice: Subject to any disclaimer, the term of this patent is extended or adjusted under 35 U.S.C. 154(b) by 525 days.

(21) Appl. No.: 12/680,867

(22) PCT Filed: Oct. 31, 2008

(86) PCT No.: PCT/US2008/081914
§ 371 (c)(1),
(2), (4) Date: Mar. 30, 2010

(87) PCT Pub. No.: WO2009/075962
PCT Pub. Date: Jun. 18, 2009

(65) Prior Publication Data
US 2010/0211423 A1    Aug. 19, 2010

Related U.S. Application Data

(60) Provisional application No. 61/005,793, filed on Dec. 7, 2007.

(51) Int. Cl.
*G01V 3/18* (2006.01)
*G06F 17/18* (2006.01)

(52) U.S. Cl.
USPC ............ 702/6; 702/181; 702/182; 702/183

(58) Field of Classification Search
USPC ........... 702/6–14, 45–57, 121–123, 181–190
See application file for complete search history.

(56) References Cited

U.S. PATENT DOCUMENTS

| | | | |
|---|---|---|---|
| 5,072,387 A | 12/1991 | Griston et al. | |
| 5,764,515 A | 6/1998 | Guerillot et al. | |
| 5,952,569 A * | 9/1999 | Jervis et al. | 73/152.01 |
| 5,992,519 A | 11/1999 | Ramakrishnan et al. | |
| 6,724,687 B1 | 4/2004 | Stephenson et al. | |
| 6,732,052 B2 * | 5/2004 | Macdonald et al. | 702/6 |
| 6,820,702 B2 | 11/2004 | Niedermayr et al. | |
| 6,868,920 B2 | 3/2005 | Hoteit et al. | |

(Continued)

FOREIGN PATENT DOCUMENTS

| | | |
|---|---|---|
| GB | 2 318 437 | 4/1998 |
| WO | WO2006/112864 | 10/2006 |

OTHER PUBLICATIONS

Hooimeijer, et al. (2006)"Advanced Production Monitoring" Society of Petroleum Engineers International Oil & Gas Conference and Exhibition in China held in Beijing, China, Dec. 5-7, SPE# 104161.

(Continued)

*Primary Examiner* — Phuong Huynh
(74) *Attorney, Agent, or Firm* — ExxonMobil Upstream Research Company-Law Department

(57) ABSTRACT

A method and system for estimating the status of a production well using a probability calculator and for developing such a probability calculator. The method includes developing a probability calculator, which may be a Bayesian network, utilizing the Bayesian network in a production well event detection system, which may include real-time well measurements, historical measurements, engineering judgment, and facilities data. The system also includes a display to show possible events in descending priority and/or may trigger an alarm in certain cases.

25 Claims, 3 Drawing Sheets

U.S. PATENT DOCUMENTS

| | | |
|---|---|---|
| 7,003,439 B2 | 2/2006 | Aldred et al. |
| 7,128,167 B2 | 10/2006 | Dunlop et al. |
| 2007/0118346 A1 | 5/2007 | Wen et al. |
| 2007/0175633 A1 | 8/2007 | Kosmala et al. |
| 2007/0276603 A1 | 11/2007 | Bringedal et al. |

OTHER PUBLICATIONS

Lentini, et. al. (2006) "A New Approach for Field Surveillance: Enhanced Monitoring Associating Smart Alarms to Produce More Oil", Society of Petroleum Engineers Annual Technical Conference and Exhibition held in San Antonio, Texas, U.S.A., Sep. 24-27, SPE# 102139.

Oberinkler, et al. (2005), "From Real-Time Data to Production Optimization", Society of Petroleum Engineers Asia Pacific Conference on Integrated Modelling for Asset Management, Kuala Lumpur, Mar. 29-30, SPE# 87008.

Poulisse, et al.(2006), "Continuous Well Production Flow Monitoring and Surveillance", Society of Petroleum Engineers Intelligent Energy Conference and Exhibition held in Amsterdam, The Netherlands, Apr. 11-13, 2006, SPE# 99963.

Van Zandvoord, et al. (2006) "Application of Real Time Surveillance and Optimization Tools on a Large Asset" Society of Petroleum Engineers Asia Pacific Oil & Gas Conference and Exhibition held in Adelaide, Australia, Sep. 11-13, SPE #100342.

Zheng, et al. (1999), "Advanced Geothermal Hydraulics Model, Phase I, Final Report—Part II" DOE/ID/13681-2.

EP Application 08002721.2-2315 Search Report dated Jun. 19, 2008.

PCT/US2008/081914 PCT Search Report dated Jun. 26, 2009.

\* cited by examiner

| | Most Probable Well Status [Time and Date] | | | |
|---|---|---|---|---|
| Well | Most Probable Well Status | Noise in the Rate | Change in Last 24 hrs. Avg. Q the day before | Count of Hours of q=0 in last 24 hr. period |
| Well 1 | loading | 32.7% | -178.5% | 0 |
| Well 2 | metastable | 5.4% | -11.4% | 0 |
| Well 3 | loading | 16.8% | -51.9% | 0 |
| Well 4 | metastable | 11.5% | -29.4% | 0 |
| Well 5 | metastable | 16.1% | -27.6% | 0 |
| Well 6 | metastable | 5.4% | -6.8% | 0 |
| Well 7 | null (likely shutdown) | | | 24 |
| Well 8 | metastable | 3.8% | -4.2% | 0 |
| Well 9 | adj choke change | 11.1% | -15.5% | 0 |
| Well 10 | loading | 18.3% | -42.4% | 0 |
| Well 11 | metastable | 0.9% | -2.7% | 0 |
| Well 12 | null (likely shutdown) | | | 24 |
| Well 13 | metastable | 1.9% | -5.6% | 0 |
| Well 14 | metastable | 2.9% | -1.2% | 0 |
| Well 15 | metastable | 0.1% | -0.1% | 0 |
| Well 16 | metastable | 3.3% | -9.8% | 0 |
| Well 17 | null (likely shutdown) | | | 24 |
| Well 18 | null (likely shutdown) | | | 24 |
| Well 19 | metastable | 0.4% | -0.1% | 0 |
| Well 20 | metastable | 3.4% | 4.2% | 0 |
| Well 21 | null (likely shutdown) | | | 24 |
| Well 22 | null (likely shutdown) | | 0.0% | 24 |
| Well 23 | null (likely shutdown) | | 0.0% | 24 |
| Well 24 | null (likely shutdown) | | | 24 |
| Well 25 | metastable | 2.3% | 9.3% | 0 |

*FIG. 5*

METHODS AND SYSTEMS TO ESTIMATE WELLBORE EVENTS

CROSS-REFERENCE TO RELATED APPLICATION

This application is the National Stage Application of International Application No. PCT/US2008/081914, filed 31 Oct. 2008, which claims the benefit of U.S. Provisional Patent Application 61/005,793 filed Dec. 7, 2007 entitled METHODS AND SYSTEMS TO ESTIMATE WELLBORE EVENTS, the entirety of which is incorporated by reference herein.

FIELD OF THE INVENTION

This invention relates to the production of hydrocarbons from a subsurface reservoir. More specifically, the present invention provides for methods and systems for building a probability calculator and using the probability calculator to estimate or predict the status of a producing well.

BACKGROUND OF THE INVENTION

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

Oil and gas fields are often metered with a wide array of measuring devices, and engineers routinely monitor production volume flow rates and other data in real time or with a short delay. Engineers monitor these measurements in order to assist in making decisions about field operations. Adverse events may severely impact the production performance of the oil and gas wells, and the accurate and timely identification of these events are the engineer's responsibility. If such events are identified in an accurate and timely manner, it is often the case that remedial action can be taken which will lower production cost, reduce downtime, improve hydrocarbon recovery, and/or increase well productivity. Avoiding adverse well production events is an important part of meeting the world's energy needs.

High quality and high frequency well production data is a recent development, but the technology for processing and interpreting such data remains in a nascent state. Because of the high frequency of the data, which gives rise to large data sets, there is a need to prioritize the order in which the data is analyzed for wellbore events. Current methods are not timely, they lack a robust prioritization method, and are prone to inaccuracy.

Presently, the data are viewed using automated charting tools drawing on a production database. Engineers use their experience to discern wellbore related events from these time-series measurements, and then use their professional judgment to decide what action to take. For example, an engineer might see rapid variation in production volumes in combination with temperature variations on the time scale of hours. Should this pattern repeat several times, an experienced engineer suspects that the well may have liquid loading issues, and might pick up the phone to call a field engineer, asking them to investigate and potentially change the flow control setting (e.g. choke) to alleviate the variations.

In current practice, the data are viewed using automated charting tools drawing on a production database, and a basic automated methodology is used to flag events for follow up by an engineer at a later time. The idea is to process the measured signals, searching for measurements which indicate a deviation from a normal state—a possible well event. For example, Oberinkler, et al. (SPE #87008) suggests using a detection system where a threshold is placed on the water cut of a well. If the water cut rises above the set threshold, then the well has probably experienced permanent water breakthrough, and an alarm is sent to the engineer. Hooimeijer, et al. (SPE #104161) have described this general framework for production event detection and call it surveillance by exception. Other authors have described similar methods for the detection of various wellbore-related fluid production phenomena. Van Zandvoord, et al. (SPE #100342) have developed an event detection and alarming system for wells produced with electric submersible pumps as well as wells that are produced using gas lift. Poulisse, et al. (SPE #99963) describe detecting water coning and water breakthrough, two phenomena afflicting subterranean wells. Lentini, et. al. (SPE #102139) used tubing head pressure, flowline pressure, and pump amperage measurements as the basis for detecting gas-lock, low production, and slugging, events that affect electric submersible pumps. The detection scheme used basic trend determination and threshold counters. Kosmala, et al. (U.S. Pat. App. No. 2007/0175633) have described a typical method for the identification of events affecting electric submersible pumps (one of many possible production methodologies for an oil well) installed in wellbores. The methodology consists of specific steps for measuring, outputting, transmitting, and processing signals related to pump performance.

All of the methods described above are threshold based methods. In this methodology a single-value threshold or an operating range defined by two values is used to establish a hard cutoff to trigger an alarm. Deficiencies of this methodology are an overabundance of false alarms, large time requirements for setting the thresholds well-by-well, and alarms with no confidence limits.

The apparatus and methodologies used for adverse event detection during drilling operations are often more advanced than those used in production operations. For example, Jervis, et al. (U.S. Pat. No. 5,952,569) have described a method and apparatus for the identification of adverse drilling events that include well kick, formation fluid influx, stuck drill pipe, pipe washouts, and other drilling events. The method relies upon measurements from flowmeter paddles, electrochemical transducers, measurement while drilling parameter sensors, and mud tank volume sensors. Their method relies upon the construction of mathematical derivatives (time derivatives, sums, products, etc.) of these measurements, their comparison to a database of prior knowledge (encapsulated in a Bayesian network) of what the mathematical derivatives of these measurements look like when an adverse event is occurring, and a probabilistic estimation of the likelihood of that specific adverse event based on any differences between the compared signal derivatives. Zheng, et al. (DOE/ID/13681-2) and Dunlop, et al. (U.S. Pat. No. 7,128,167) have also suggested using Bayesian networks to detect well kick and other drilling events. Niedermayr, et al (U.S. Pat. No. 6,820,702) have described a method and apparatus for the detection of specific drilling events (stuck pipe, pack off, or kicks), and suggest the use of a neural network or fuzzy logic processor, methodologies that are more advanced than a simple threshold based method. McDonald, et al. (U.S. Pat. No. 6,732,052) have also suggested the use of a neural network to detect drilling events.

Historically, Bayesian networks have been used in non-real-time applications and have relied largely upon expert knowledge and not statistical learning in their construction. For example, Woronow, et al. (WO 2006/112864) have used Bayesian networks to predict sand quality in geological formations. Only in drilling applications have others seen utility in real-time applications of Bayesian networks so far.

SUMMARY OF THE INVENTION

In one embodiment of the present invention a method for estimating the status of a producing well is provided. The method comprises obtaining at least one real-time well production measurement; (b) calculating at least one mathematical derivative of the at least one real-time well production measurement; (c) developing a probability calculator based on the at least one mathematical derivative; (d) calculating a status of the producing well utilizing the probability calculator; and (e) displaying the status of the producing well for a user. The method may further include obtaining and using facilities data in the probability calculator and may also include updating the mathematical derivatives using updated well production data and calculating and displaying an updated status of the producing well for the user using the updated probability calculator.

In another embodiment of the present invention a method for well event detection is provided. The method includes developing a probability network; measuring at least one physical property of at least one well to generate well measurements; analyzing the well measurements, wherein analyzing the well measurements includes at least calculating mathematical derivatives of the well measurements; transferring at least the derivatives of the well measurements to the probability network; calculating the probability of an event utilizing at least the probability network and the derivatives of the well measurements; and displaying the probability of the event for a user. The method may also incorporate facilities data, and may run in a predictive or recognition mode. Further, the method may include utilizing updated data to provide an updated probability of the event for the user.

In still another embodiment of the present invention, a system for estimating the status of a producing well is provided. The system comprises a database configured to store at least one well production measurement; a processor configured to determine a mathematical derivative of the at least one well production measurement; a probability network in communication with the processor and the database, wherein the probability network is configured to calculate the status of the producing well utilizing at least the mathematical derivative of the at least one well production measurement; and a display configured to display the status of the producing well calculated by the probability network.

BRIEF DESCRIPTION OF THE DRAWINGS

The foregoing and other advantages of the present invention may become apparent upon reviewing the following detailed description and drawings of non-limiting examples of embodiments in which:

FIG. 5 is an illustration of an exemplary sample display of a Bayesian network-determined most probable well event for a group of wells.

DETAILED DESCRIPTION OF CERTAIN EMBODIMENTS

In the following detailed description section, the specific embodiments of the present invention are described in connection with preferred embodiments. However, to the extent that the following description is specific to a particular embodiment or a particular use of the present invention, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

As used herein, the term "facilities data" refers generally to well production related values that do not change continuously over time. For example, the state of the choke on a flow line remains fixed in one position and does not change until it is fixed in a different position by an operator. These kinds of data are discrete. In this embodiment, these "facilities data" are generally related to the fluid gathering system, such as the diameter of the tubing string, choke state, and other system operational limits or setpoints.

As used herein, the terms "derivative" or "mathematical derivative" are used interchangeably with "characteristic mathematical quantities" and "preferred mathematical measures." These quantities are computed from time-dependent variables and change with time. It is typical that such measures would be computed over a window of time. For example, a seven day running average is an example of a mathematical derivative of a time series variable. The term is not limited to its definition from the mathematical field of calculus.

Embodiments of the present invention provide a method and system for building a probability calculator and using the probability calculator to estimate or predict the status of a producing well. More specifically, the estimation method includes taking time-based measurements and system state measurements (these are generally static or non-time based), then inputting the measurements into a probability calculator (which may be a Bayesian network) to determine a likely status for the producing well, which may be displayed as a probability or likelihood of an event occurring.

In one preferable embodiment, the analysis of downhole and surface measurements during production is automated (e.g. pressure, rate, temperature measurements, and others) in order to rapidly identify adverse production system events. Such analysis may be automated by statistically characterizing expert judgment of the events, and by linking through hardware and software interfaces directly to the measurements.

Figure 1:
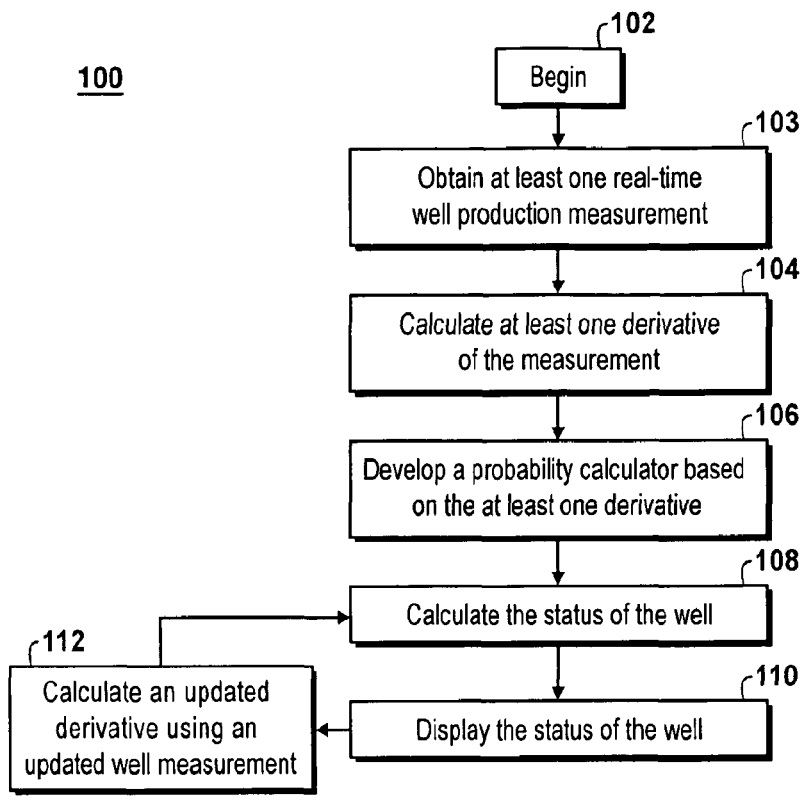
FIG. 1 is an exemplary process diagram of one method of estimating the status of a producing well.

Turning now to the figures, FIG. 1 is an exemplary process diagram of one method of estimating the status of a producing well. The method 100 begins at 102 and includes obtaining a well production measurement (e.g. a real-time well production measurement or a historic well production measurement) 103, calculating a mathematical derivative based on the well production measurement 104, and developing a probability calculator (e.g. probability network) 106 based on the derivative. Next, the process 100 includes calculating the status of the well 108, and displaying the well status 110. The process 100 may continue by gathering updated well measurement data and calculating updated derivatives 112, then repeating steps 108 and 110 to show an updated list of probabilities in real-time or approximately real-time. The well status may be calculated using the probability calculator developed in step 106.

In one embodiment, the probability calculator may be developed 106 using well production measurements 103 such as pressure, temperature, and production rate in the well. These well production measurements 103 may also be referred to as "surveillance variables." Some exemplary equipment related measurements include pump rotational speed and amperage. Pressure measurements may be recorded by dedicated downhole devices, associated pump intake and outtake pressure measurement devices, or surface flowline pressure measurements. Temperature measurements may be recorded, for example, by dedicated downhole or surface thermometers. Rate measurements may be recorded from single fluid phase or multiphase fluid wellhead or downstream flow meters.

In an alternative embodiment, the probability calculator may alternatively be developed 106 by selecting a field for which there exists abundant pressure and rate data of high quality, compiling a list of all of the possible states ("events") that the wells in the selected field may experience, gathering the historical data for the wells of interest and reviewing the historical data with the engineers ordinarily responsible for operation of those wells. The engineers then assign their best judgment of the status of a well for each hour in the time period in review. It is preferable that this historical set of data is representative of the full range of behaviors exhibited by the wells.

The process 100 may further include computing mathematical derivatives 104 of the well production measurements 103 that are likely to be indicative of the events of interest. The mathematical derivatives 104 of the measured historical signals may be calculated using the mathematical theorem of Bayes or any other mathematically related algorithm that computes joint probabilities. These joint probabilities may be used to relate the mathematical derivatives to the expert identified events. Commercially available software that does the mathematics is available.

In one preferred embodiment, the probability calculator developed in step 106 should be integrated into the method of estimating the status of a producing well 100 in such a manner that the same measurement types 103 that were used to create the probability calculator are transmitted to the mathematical derivative calculator in a real-time fashion. The mathematical derivative calculator may transmit its output to the probability calculator in a real-time fashion. An alarm system may be designed that can take advantage of the probabilistic nature of the probability network and is compatible with how engineers respond to field problems. The probability calculator may be updated and the alarm system adjusted as engineers gain experience with the system.

The production method also controls which well production measurements are of interest. The most important measurements for a particular well or field may be referred to as the "key performance indicators." For example, if the field is producing using water injection, injection rates and water production rates may be the key performance indicators. In another example, the key performance indicators for a cold flow heavy oil production process may include cavity pump speed and other variables.

It should be noted that measurements useful for the diagnosis of drilling events may be significantly different than those useful for the diagnosis of production events. Drilling measurements may include flow into and out of the well rather than production through a production string. Drilling measurements may also include a stand-pipe pressure transducer (SPT) for monitoring mud tank volumes. Mud tank volumes, for example, are irrelevant in production operations.

Further, the probability calculator developed at 106 may utilize Bayes' theorem or another method of calculating probabilities such as the Hidden Markov Model or other such probability calculation method. The well measurement derivative developed at 104 may be time derivatives, sums, percent change, averages, day over day change, day over week change, day over month change, week over month change, standard deviation, counting the frequency of repeated values, and other similar mathematical derivations or combinations of the measured signals.

Figure 2:
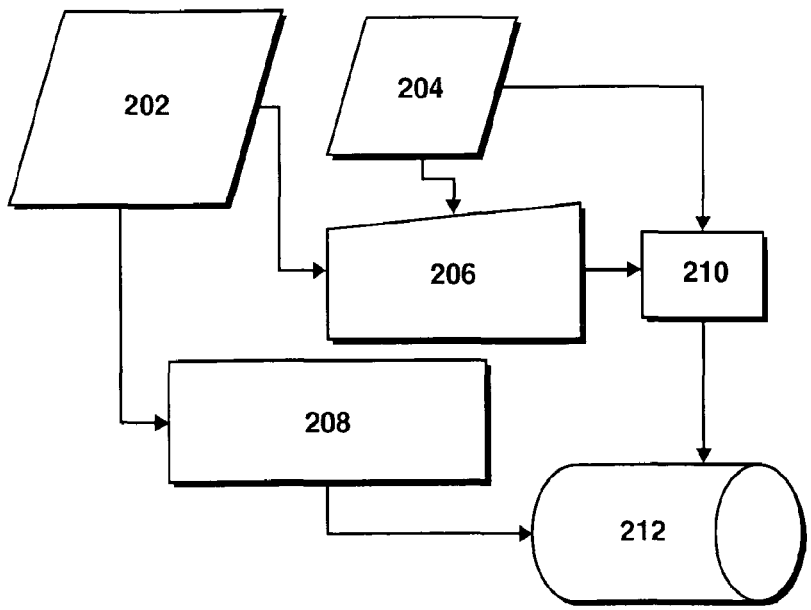
FIG. 2 is an illustrative diagram of one approach to developing a probability calculator as shown in FIG. 1.

FIG. 2 is an illustrative diagram of one approach to developing a probability calculator as shown in FIG. 1. As such, FIG. 2 may be best understood with reference to FIG. 1. The probability calculator diagram 200 includes historical measurements from similar wells 202 and facilities data (e.g. discrete or system state data) 204, which are used to develop an engineering judgment of the data 206. The historical measurements 202 are also used in a computation of characteristic mathematical quantities 208. The facilities data 204, and engineering judgments 206 are combined to form a static or relative data set 210. This static data set 210 is then combined with the computational data set 208 to form the probability calculator 212.

In one embodiment, data set 206 may include asking surveillance engineers to identify events of interest in historical sets of measured time-series variables 202 using simple charts, their personal knowledge of the well and static (non time-series) facility data 204 (choke state, flowline sizes, prevailing compressor conditions) and no mathematical aides. Separately, simple mathematical functions 208 such as standard deviation, day over day percent change, and other measures are calculated for several variables over the time range of interest. In this manner, the probability network 212 probabilistically associates with each event a particular characteristic mathematical signature. The structure of the probability network 212 is defined by a set of variables and the probabilistic relationships between them. Because the particular set of measured variables and events of interest may differ from field-to-field, the probability calculator building process 200 should be completed separately for each field (though not necessarily for each wellbore).

In one exemplary embodiment, the probability network 212 functions according to Bayes' theorem (in which case the network 212 may be called a Bayesian network 212 or BN 212). Bayes' theorem is an efficient mathematical framework for calculating probabilities according to Bayesian probability. The theorem is stated as:

$$P(A|B)=P(B|A)P(A)/P(B)$$

The theorem may be stated in English as the conditional probability of event A, given event B, is equal to the conditional probability of event B, given event A, times the prior probability of event A, normalized by the prior probability of event B. The Bayesian network 212 may be incorporated into engineering work procedures by integrating it into surveillance software that is coupled to databases where real-time measurements are stored.

Figure 3:
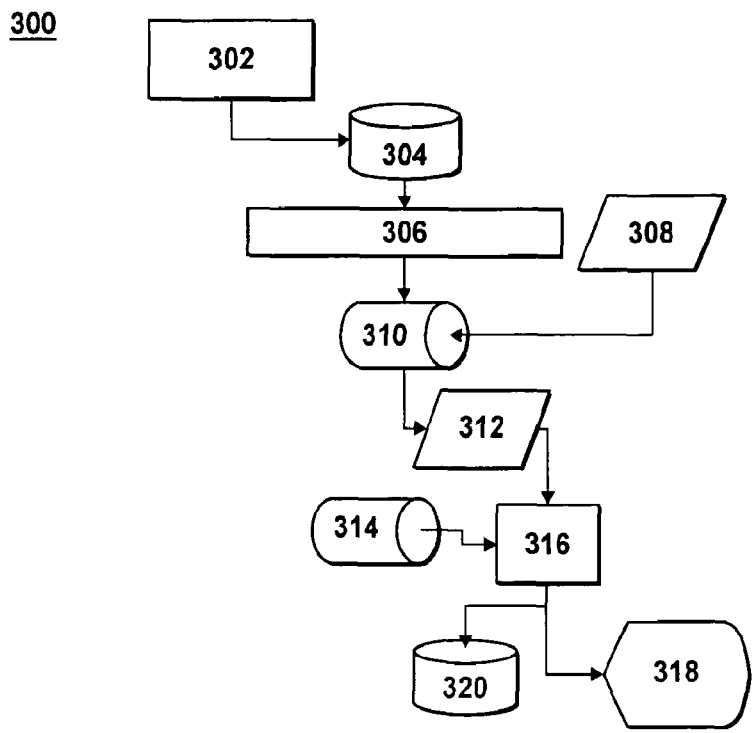
FIG. 3 is an illustration of a schematic of an exemplary event detection system utilizing the probability network of FIG. 2.

FIG. 3 is an illustration of a schematic of an exemplary event detection system utilizing the probability network of FIG. 2. Hence, FIG. 3 may be best understood with reference to FIG. 2. The event detection system 300 (which may run in a real time mode) includes time series measurements 302, which are transferred to a database 304, such as a Supervisory Control And Database (SCADA) frequently enough to be useful to the surveillance engineer (e.g. daily frequency or higher). From the database 304, a processor or computer computes characteristic mathematical quantities 306, which are used in combination with system state (e.g. facilities) data 308 in a probability calculator 310 (which may be the probability calculator 212) to produce estimated event probabilities 312. The event probabilities 312 and stored user settings 314 are fed into an alarm and prioritization calculator 316. The results from the alarm and prioritization calculator 316 are then sent to a display 318, such as a graphic user interface (GUI), and storage 320 for archiving and later reference.

In one embodiment of the invention, the time series measurements 302 may include at least pressure, temperature, rate, and other equipment-related measurements. For example, potential equipment related measurements include pump rotational speed and amperage. Pressure measurements may be recorded by dedicated downhole devices, associated pump intake and outtake pressure measurement devices, or surface flowline pressure measurements. Temperature measurements may be recorded by dedicated downhole or surface thermometers, for example. Rate measurements may be recorded from single fluid phase or multiphase fluid wellhead or downstream flow meters. The production method also controls which variables are of interest. For example if the field is producing using water injection, injection rates and water production rates will be key for understanding events in injection wells. All of these measurements are relevant to production surveillance. Measurements that are useful for the diagnosis of drilling events are largely different than those useful for the diagnosis of production events.

In one embodiment, the database 304 may be a SCADA and may be saved on a centralized server as part of a network, may be remotely accessible through wired or wireless networks, may be password protected or encrypted data, redundantly available, or may be local or located remote from the field. The recorded measurements are then transferred to a centralized server and analyzed. In one embodiment, the database 304 may be accessible worldwide, located in Houston, Tex., and populated by data transfer from field location compilers or similar devices.

The computed characteristic mathematical quantities 306 may include mathematical derivatives of the recorded measurements from the database 304. In one exemplary embodiment, these mathematical derivatives are looked at before absolute values are assessed because adverse events typically may be best identified by looking for changes in process parameters. Some exemplary calculations 306 include day over day change, day over week change, day over a month change, week over month change, and standard deviation of all process parameters computed on an absolute or percentage basis. Additional calculations 306 may include counting the frequency of repeated values. Some prior art methods for predicting drilling events calculate residuals left after subtraction of the signal data from a stored database of representative model event data, which is more suited to looking for small changes and searching high frequency data sets. In production applications, such as the one described in the present invention, small changes may not be as significant as in drilling applications.

In one embodiment of the present invention, facilities data 308 may include any and all data which is not time-series data, and is related to the system or facility state. Such data may include, for example, pump depth, choke type, flowline diameter, and well coordinates.

In one embodiment of the present invention, the probability calculator 310 is a Bayesian network that computes, for all of the possible events that are known to it, the probability that the analyzed time series measurements 306 indicate that the event occurred during that time window 312. Whereas a threshold-based method provides a simple pronouncement that the event did or did not occur, the probability calculator 310, taking into account all available information and prior knowledge, provides the rank order of the most probable events, and the associated probabilities for each one. This helps engineers prioritize their decisions. A well with a high probability of a particularly adverse event, such as the shutdown of a well, will receive attention more quickly than a well with a lower probability of well shutdown, which might in turn receive attention more quickly than a well with a high probability of a minor event. The probabilities themselves can serve as the alarm function 316. This is a recognition that not all alarms are of equal importance.

In one exemplary embodiment of the present invention, the stored user settings 314 may be set based at least in part on the historic performance of related wells 202, facilities data 308, and engineering judgment 206. It could also be a default setting or group of settings. These settings could be manually or automatically updated by an engineer locally or remotely. The alarm and prioritization calculator 316 may list the events according to their calculated probability 312 and the thresholds and other information from the user settings 314. The display of the event prioritized probabilities 318 may be on any type of display including, for example, a computer screen, a GUI, a personal digital assistant or phone or other handheld device and may display a single alarm in certain circumstances, a list of probabilities, or some combination depending on settings 314. The storage 320 may be local or remote, network connected to a central server or database or redundantly available on multiple locations.

In one exemplary embodiment, the system 300 can be programmed by the user or the creator to interpret the probabilities 312 in an automated fashion. By establishing lists of high-volume wells or events of particular interest, the system may be designed to send alarms, with their associated event probabilities, to system users over a display or other device 318. If users elect not to receive alarms in real time, the probabilistic analysis may be stored, and retrieved later for further use.

In one exemplary embodiment, rate measurements 302 and their mathematical derivatives 306 may be the primary inputs, with pressure and temperature measurements playing a secondary role. For example, an electronic flowmeter of high precision and high-frequency installed at the wellhead may transmit the recorded fluid flow rates of all flowing phases to the SCADA 304. Downhole and wellhead pressures may also be transmitted, and temperature since it is usually available when pressure measurements are available. If downhole equipment is installed, such as an electric submersible pump or a progressing cavity pump, the preferred implementation should include the transmission of amperage and rotational speed.

The preferred mathematical measures 306 depend on the time scale of the events of interest. If daily operational events are of interest then the day-over-day change in the oil or gas flowrate will be significant in detecting events. Many physical phenomena cause instabilities in measurements. For example, the process of the liquid load up of gas wells includes a phase in which the gas flowrate of the well is unstable (sometimes called metastable). The standard deviation of a set of measurements recorded over a particular time scale closely corresponding to the time scale over which the instability occurs may be an advantageous mathematical derivative 306 for enabling a robust detection method of the instability.

While the probability calculator 212 is the preferred probability calculator 310 in the event detection scheme 300, other implementations are also possible. Not all of the variables used in probability calculator 310 are equally important for the interpretation of the events. It is natural that some variables contribute strongly and others less so to the quality of the interpretation. One advantage of the invention over prior inventions is that probability calculator 310 will allow the engineer to precisely calculate which variables are most important to the well or group of wells. One exemplary implementation of the invention is to choose the subset of variables that contribute most strongly and build a decision tree based on those variables. The decision tree can be used as a simplified event detector instead of the full-fledged probability calculator 310. The advantage of this less robust alternative implementation is that it is often easier to incorporate this method into existing software systems than to incorporate a true probability calculator 310.

In one exemplary embodiment of the present invention, the alarming system 316 is tunable by the user. For example, the user might specify that they want to see all alarms that indicate a 90% or higher chance of an unexplained well shutdown. In the preferred implementation the calculated event probabilities 312 are stored to disk 320 for all measurement history. This enables an engineer to examine the alarm history of a well. A rising probability 312 for an event over time indicates greater and greater confidence that the interpretation is true. One desirable method to filter the alarm data may be to only display alarms for less detrimental events if the probability of the event has been high for a sustained period of time.

In some cases, an operator may have access to contextual data that is not captured in the event detection system 300, despite the inclusion of as much facilities data 308 as possible when the probability calculator 310 is constructed. In one exemplary embodiment, the invention provides the probabilities of all possible events in a user-friendly format, and is configured such that the user may access the basis for calculating the probabilities 312. This allows the user to interpret how to respond based on any special contextual information that they may possess. This interface allows for the user to provide feedback so that the event detection system 300 can be improved, and its estimated probabilities 312 made more accurate.

EXAMPLES

Figure 4:
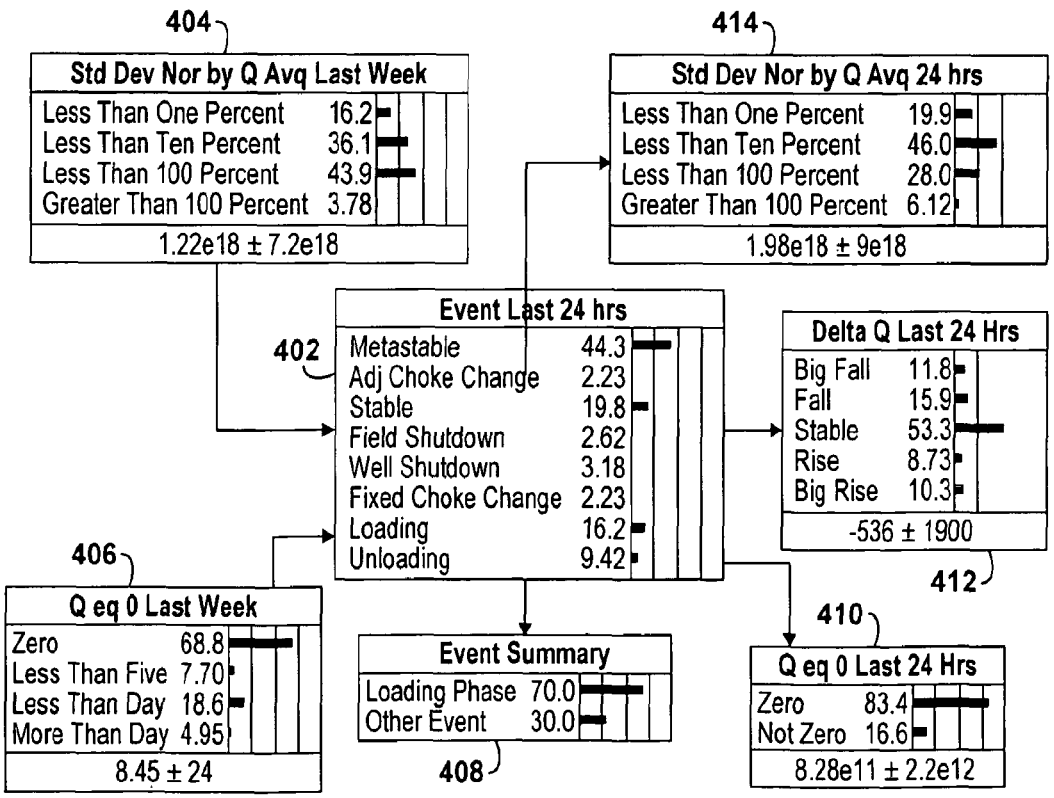
FIG. 4 is an illustration of an exemplary sample Bayesian network of FIGS. 2 and 3 developed to report on the status of wells in a gas field, including possible events.

FIG. 4 is an illustration of an exemplary sample Bayesian network of FIGS. 2 and 3 developed to report on the status of wells in a gas field, including possible events. As such, FIG. 4 may be best understood with reference to FIGS. 2 and 3. In this example, the Bayesian network (BN) 400 may be the probability calculator or network 212 or 310. Five mathematical measures 404, 406, 410, 412, and 414 are used to interpret the status of the well during the most recent 24 hours of production. These measures are the standard deviation of the observed hourly rates recorded during the week prior to the last 24 hours (SDLW) 404, the number of times an hourly recorded rate of zero occurred during the week prior to last 24 hours (ZRLW) 406, the standard deviation of the observed hourly rates recorded during the last 24 hour period (SD24) 414, the number of times an hourly recorded rate of zero occurred during the last 24-hour period (ZR24) 410, and the change in the absolute value of the rate during the last 24 hours normalized by the average rate (AV24) 412. All of these measures are based on the recorded flowrate, which may be a time series measurement 302. All five exemplary characteristic mathematical quantities, SDLW 404, ZRLW 406, SD24 414, ZR24 410, and AV24 412 may be characteristic mathematical quantities 208 derived from historical measurements 202 and used to build the BN 400 by the process 200. The same quantities may also utilize the BN 400 in the process 300.

When all five of the measurements 404, 406, 410, 412, and 414 are available the BN 400 gives its most accurate probability estimate 402 (which may be the estimated event probabilities 312 as shown on display 318) of well status during the last 24 hours. When all five measurements are used the network is operating in a "recognition mode," estimating the well status during the previous 24 hours. However, if only the most recent week's measurements 404 and 406 are used, the BN 400 can make a prediction about the next (future) 24-hour period. In this manner the BN 400 operates in a "predictive mode." A recognition mode is more accurate because it utilizes more data.

In this example, the possible events 402 are the three different phases of liquid loading—metastable, loading, and unloading—as well as unexplained well shutdowns, field shutdowns, fixed choke changes, and adjustable choke changes. The event summary 408 simply groups certain events together to give the engineer an additional tool for monitoring and evaluating well events.

FIG. 5 is an illustration of an exemplary sample display of a Bayesian network-determined most probable well event for a group of wells. The Bayesian network (BN) may be probability calculator 212 or 310 and the display may be display 318. As such, FIG. 5 may be best understood with reference to FIGS. 2 and 3. The display 500 includes a column 502 labeled "Most Probable Well Status" (actual probability not shown) for each of the listed wells in column 503, which may all be associated gas wells in a single field. Three other columns show the values of three different variables (here, all related to flowrate), including "Noise in the Rate" 504, "Change in Last 24 hours divided by Average Q the day before" 506, and "Count of Hours of q=0 in last 24 hour period" 508. These variables 504, 506, and 508 are some of the inputs to the BN.

In the prior art processes, the engineer would look at charts of the flow rate over time for all wells with production drops in an effort to determine the cause(s). With an embodiment of the invention in hand, the surveillance engineer can use the display 500 to prioritize which wells 503 to examine in more detail, skipping the wells for which the BN-determined event is known not to be detrimental (e.g. where the value in column 508 is 24 and the statement in 502 is null).

While the present invention may be susceptible to various modifications and alternative forms, the exemplary embodiments discussed above have been shown only by way of example. However, it should again be understood that the invention is not intended to be limited to the particular embodiments disclosed herein. Indeed, the present invention includes all alternatives, modifications, and equivalents falling within the true spirit and scope of the appended claims.

What is claimed is:

1. A method for estimating the status of a producing well, comprising:
  (a) obtaining at least one real-time well production measurement and facilities data, wherein the facilities data comprises well production values that do not change continuously over time;
  (b) calculating at least one mathematical derivative of the at least one real-time well production measurement;
  (c) developing a probability calculator based on the at least one mathematical derivative and the facilities data;

(d) calculating a status of the producing well utilizing the probability calculator; and (e) displaying the status of the producing well for a user.

2. The method of claim 1, further comprising:

(f) obtaining at least one updated real-time well production measurement;

(g) calculating at least one updated mathematical derivative of the at least one real-time well production measurement; and (h) repeating steps (c) through (e) based on the at least one updated mathematical derivative of the at least one updated real-time well production measurement.

3. The method of claim 1 wherein the probability calculator is utilized in one of a recognition mode and a predictive mode.

4. The method of claim 1 wherein the estimated status includes ordinary operating states and adverse events, wherein the adverse events include at least liquid loading, compressor cycling, pump failures, field shutdowns, and well shutdowns.

5. The method of claim 1 wherein the probability calculator is a Bayesian network.

6. The method of claim 1 wherein the probability calculator is a set of rules derived from probability estimates calculated using a Bayesian network.

7. The method of claim 1 wherein the real-time well production measurements comprise flowing bottom hole pressure, flowing bottom hole temperature, pump amperage, pump rotational speed, tubing head pressure, tubing head temperature, injection rate, and producing rate.

8. The method of claim 1, wherein the facilities data comprises choke open state, pump depth, choke type, flowline diameter, and well coordinates.

9. A method for well event detection, comprising:
developing a probability network;
measuring at least one physical property of at least one well to generate well measurements;
gathering facilities data for the at least one well;
analyzing the well measurements, wherein analyzing the well measurements includes at least calculating mathematical derivatives of the well measurements;
transferring at least the derivatives of the well measurements and the facilities data to the probability network;
calculating the probability of an event utilizing at least the probability network and the derivatives of the well measurements and the facilities data; and
displaying the probability of the event for a user.

10. The method of claim 9, wherein the steps of the process are repeated using updated data to display an updated probability of the event for the user.

11. The method of claim 9 wherein the probability network is a Bayesian network.

12. The method of claim 11, wherein the well measurements are one of flowing bottom hole pressure, flowing bottom hole temperature, pump amperage, pump rotational speed, tubing head pressure, tubing head temperature, injection rate, and producing rate.

13. The method of claim 9 wherein the probability network is a set of rules derived from probability estimates calculated using a Bayesian network.

14. The method of claim 9, wherein the facilities data includes at least one of choke open state, pump depth, choke type, flowline diameter, and well coordinates.

15. The method of claim 9, wherein the probability calculator utilizes simple mathematical functions to probabilitistically associate a suite of calculated measurements with the well event.

16. The method of claim 15, wherein the simple mathematical functions are at least one of standard deviation and day over day percent change.

17. The method of claim 9, wherein the mathematical derivatives of the well measurements are at least one of time derivatives, sums, percent change, averages, day over day change, day over week change, day over month change, week over month change, standard deviation, and counting the frequency of repeated values.

18. The method of claim 9 wherein the probability of the event is displayed in a rank order for the user.

19. The method of claim 9 wherein the probability of the event is displayed in real-time.

20. The method of claim 9, wherein the probability network is utilized in one of a recognition mode and a predictive mode.

21. A system for estimating the status of a producing well, comprising:
a database configured to store at least one well production measurement and at least one facilities data;
a processor configured to determine a mathematical derivative of the at least one well production measurement;
a probability network in communication with the processor and the database, wherein the probability network is configured to calculate the status of the producing well utilizing at least the mathematical derivative of the at least one well production measurement and the at least one facilities data; and
a display configured to display the status of the producing well calculated by the probability network.

22. The system of claim 21, wherein the status is at least one of a list of probabilities, an alarm, and a combination thereof 23. The system of claim 21, wherein the probability network is a Bayesian probability network.

24. The system of claim 21, wherein the system is configured to update the status of the producing well in real-time.

25. A method of developing a probability calendar in a producing well comprising:
providing at least one historical measurement from at least one similar well and a facilities data set;
developing an engineering judgment using at least the one historical measurement and the facilities data set;
developing at least one characteristic mathematical quantity together using the at least one historical measurement;
developing a static data set utilizing at least the facilities data set and the engineering judgment; and
combining the static data set and the at least one characteristic mathematical quantity to form a probability calculator configured to associate a particular characteristic mathematical signature with a wellbore production event.

* * * * *